United States Patent [19]

Minamida et al.

[11] Patent Number: 4,533,006
[45] Date of Patent: Aug. 6, 1985

[54] COMBINATORIAL MEASURING METHOD AND APPARATUS

[75] Inventors: Kazukiyo Minamida; Yoshiharu Asai, both of Shiga, Japan

[73] Assignee: Kabushiki Kaisha Ishida Koki Seisakusho, Kyoto, Japan

[21] Appl. No.: 489,839

[22] Filed: Apr. 29, 1983

[30] Foreign Application Priority Data

Apr. 30, 1982 [JP] Japan .................. 57-73656
May 10, 1982 [JP] Japan .................. 57-78638

[51] Int. Cl.³ .................. G01G 19/22; G01G 19/52
[52] U.S. Cl. .................. 177/25; 177/1; 177/50
[58] Field of Search .................. 177/1, 25, 50

[56] References Cited

U.S. PATENT DOCUMENTS

| | | | |
|---|---|---|---|
| 4,336,852 | 6/1982 | Hirano | 177/25 |
| 4,341,274 | 7/1982 | Hirano et al. | 177/50 |
| 4,344,492 | 8/1982 | Hirano | 177/25 |
| 4,385,671 | 5/1983 | Hirano | 177/25 |
| 4,418,771 | 12/1983 | Henry et al. | 177/1 |

*Primary Examiner*—George H. Miller, Jr.
*Attorney, Agent, or Firm*—Staas & Halsey

[57] ABSTRACT

A plurality of weighing data are combined to find a total weight combination closest to a preset value within an allowable preset range. Articles are discharged from those weighing machines which give such a total weight combination. For such a combinatorial computation, the empty weighing machines are first detected from among the weighing machines for which the combinatorial computation has been carried out, and then articles are supplied to the empty weighing machines. Weighing data from a number of weighing machines, selected from a plurality of weighing machines, are combined to allow selection of a weight combination equal or closest to the preset value. If a total weight combination given by the selected weighing machines falls within the allowable preset range, then articles are discharged from those weighing machines which give such a total weight combination during a first cycle. In a second cycle of combinatorial computation, a predetermined number or fewer weighing machines are selected from the weighing machines other than those selected for discharging articles in the first cycle, and combinatorial computation is effected on the selected weighing machines. First, it is determined whether there can be found a weight combination in the allowable preset range, and, if not, a new combination of weighing machines is selected from all weighing machines for a third combinatorial computation cycle.

10 Claims, 7 Drawing Figures

COMBINATORIAL MEASURING METHOD AND APPARATUS

CROSS-REFERENCE TO RELATED APPLICATION

This application is related to U.S. application Ser. No. 320,693, filed Nov. 12, 1981, which issued on Aug. 2, 1983 as U.S. Pat. No. 4,396,078.

BACKGROUND OF THE INVENTION

The present invention relates to a combinatorial measuring method and apparatus for combining weighing data from a plurality of weighing machines, finding combined weights which are equal to a preset value or closest to such a preset value within an allowable preset range, and discharging articles from those weighing machines which have given such combined weights thus determined.

In conventional weighing methods of the type described, batches of articles are generally supplied only to those weighing machines which have discharged batches of articles, except when the weighing system starts operating. When no batch of articles is supplied to a certain weighing machine due to an uneven supply of articles to the weighing machines or for some other reason, that empty weighing machine is far less likely to be supplied with a batch of articles than the other weighing machines which are properly supplied with batches of articles. Therefore, once a weighing machine is accidentally left empty, it tends to remain empty for a long period of time. This causes a substantial reduction of the number of weighing machines taking part in the combinatorial weighing operations, so that the accuracy of the combinatorial weighing operation will be lowered.

Various attempts have been made to improve combinatorial weighing methods. The applicants of the subject application have filed Japanese Patent Application No. 55-162983 (corresponding to U.S. Pat. No. 4,396,078) which discloses a novel method of speeding up weighing operations while maintaining a given degree of accuracy of combinatorial weighing.

The natures of some articles is conducive to an uneven supply of articles to weighing machines. When this happens, a combination of weighing machines giving combined weights within an allowable preset weight range may not be available even after all predetermined weight combinations have been executed. To cope with this difficulty, there is known a method of additionally supplying a batch of articles to a weighing machine, and then combining article weights measured by the same group of weighing machines. This method requires a weighing machine supplied with additional articles to participate in a next combinatorial weighing operation. Therefore, the method cannot be incorporated in the foregoing method disclosed in Japanese Patent Application No. 55-162983 since with the disclosed method, weighing machines supplied with batches of articles are allowed to take part in combinatorial weighing only in a next combinatorial weighing cycle but one.

There has been a need for a method of finding a weight combination falling within an allowable preset range without impairing the high-speed weighing operation performed by the above disclosed method in the event of a failure of determining a combination of weighing machines which provide a weight combination within the allowable preset range.

SUMMARY OF THE INVENTION

It is an object of the present invention to eliminate empty weighing machines during combinatorial weighing operation to increase the degree of accuracy of combinatorial weighing.

Another object of the present invention is to provide a method capable of quickly finding a combination of weights falling within an allowable preset range without disturbing the cycles of article weighing operation, and of correcting a failure of supplying articles or other difficulties which have resulted in an inability to find such a weight combination within the allowable preset range.

According to the present invention, combinatorial weighing is effected by combining a plurality of weighing data, finding a combination of total weights closest to a preset value within an allowable preset range, and discharging batches of articles from those weighing machines which are combined to give the weight combination thus found. In such combinatorial weighing, whether or not there is an empty weighing machine among the weighing machines taking part in combinatorial weighing is first detected, and if there is such an empty weighing machine, then a batch of articles is supplied to that weighing machine.

Further according to the present invention, combinatorial weighing is performed by combining weighing data from a predetermined number of weighing machines or less selected from a plurality of weighing machines, selecting a combination of weights equal or closest to a preset value, discharging articles from those weighing machines which are combined to give such a weight combination when the total weight of the selected combination falls within an allowable preset range, and selecting, in a next weighing operation, as the predetermined number of weighing machines or less, machines other than the weighing machines selected in the previous weighing operation, to effect a combinatorial arithmetic operation. In the above combinatorial weighing, it is first determined whether or not a combination of weights can be found within the allowable preset range, and if no such combination of weights in the allowable preset range can be found, then a new combination of weighing machines to take part in the next weighing operation is selected from all of the weighing machines.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A combinatorial weighing method according to an embodiment of the present invention will be described with reference to FIGS. 1 through 3.

Figure 1:
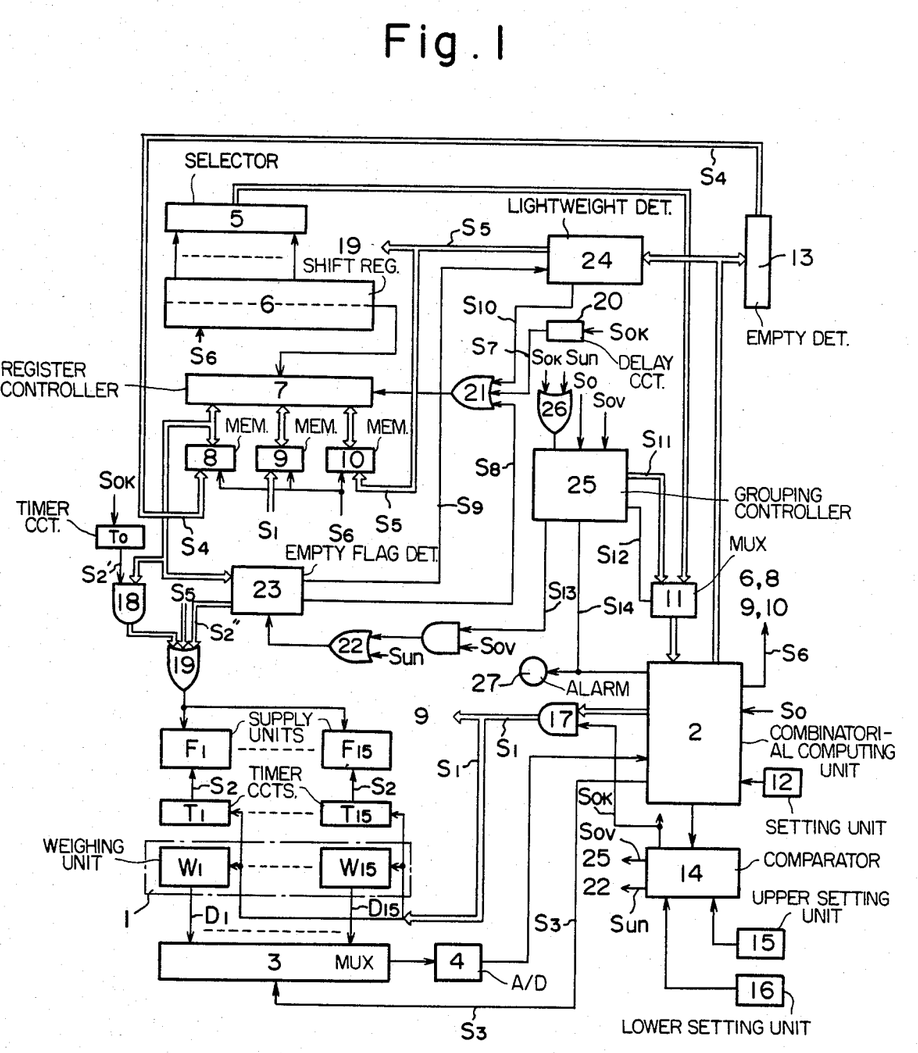
FIG. 1 is a block diagram of an apparatus for carrying out a combinatorial weighing method of the present invention for eliminating any empty weighing machine.

As shown in FIG. 1, an apparatus for effecting the combinatorial weighing method has a weighing unit 1 comprising a plurality (fifteen, for example) of weighing machines W1 through W15 circularly arranged at angularly equal intervals. The weighing machines W1 through W15 discharge batches of articles from their weighing hoppers (not shown) in response to a discharge command signal S1 from a combinatorial computing unit 2, and are supplied with batches of articles from supply units F1 through F15, respectively, a preset interval of time after the articles have been discharged. The weighing machines W1 through W15 issue weighing data D1 through D15. The supply units F1 through F15 are associated respectively with the weighing machines W1 through W15, and are responsive to a supply command signal S2 from timer circuits T1 through T15 to supply batches of articles to the weighing hoppers of the corresponding weighing machines.

The timer circuits T1 through T15 serve to provide a predetermined difference between the time when the weighing hoppers start discharging articles and the time when the weighing hoppers start being supplied with articles. The timer circuits T1 through T15 are energizable in response to the discharge command signal S1 and, upon elapse of a given interval of time, issue the supply command signal S2.

The weighing data D1 through D15 issued from the weighing machines W1 through W15, are selected by a first multiplexer 3. Only the weighing data selected by the first multiplexer 3 are successively delivered through an A/D converter 4 to a combinatorial computing unit 2. The first multiplexer 3 is controlled to select the weighing data by a combination command signal S3 issued from the combinatorial computing unit 2.

A selector 5 is employed to determine which weighing machines are to be designated by the combination command signal S3. The selector 5 is supplied with weighing machine numbers (numbers assigned respectively to the weighing machines for identification purposes) and flags indicating the operating conditions of the weighing machines from a shift register 6. Based on these input data, the selector 5 determines whether the weighing machines W1 through W15 are in the supply or discharge cycle, and selects a required number of weighing machines which are not in either the discharge or the supply cycle. For example, where there are a total of fifteen weighing machines available, a maximum of ten out of these weighing machines are picked out which are not in the article discharge or supply cycle.

The shift register 6 serves to store the weighing machine numbers and the flags indicating operating conditions of the weighing machines, the weighing machine numbers being paired with the flags, respectively. The shift register 6 is controlled by a register controller 7 for shifting the information stored therein.

The register controller 7 is connected to an empty memory 8, a discharge memory 9 and an addition memory 10. Each of these memories 8, 9, 10 is composed of memory devices such as flip-flops (fifteen in number, for example) corresponding respectivly to the weighing machines. The discharge command signal S1, an empty detection signal S4, an additional supply signal S5, and other signals are stored as flag signals in these memories 8, 9, 10.

The register controller 7 detects the weighing machine numbers of empty weighing machines, the weighing machine numbers of those weighing machines which are in the mode of discharging articles, and the weighing machine numbers of those weighing machines which are in the mode of being additionally supplied with articles, based on the flags stored in the memories 8, 9, 10. Upon detection of these weighing machine numbers, the register controller 7 clears the corresponding weighing machine numbers and their flags in the shift register 6, and shifts the remaining weighing machine numbers and their flags successively leftward (for example, in FIG. 1) to the cleared storage locations. Then, the register controller 7 writes the weighing machine numbers and their flags as detected from the memories 8, 9, 10 into the righthand storage locations from which the data have been cleared. Stated otherwise, the weighing machine numbers and their flags, as selected by the selector 5, are erased in the shift register 6, and the remaining weighing machine numbers and flags are successively shifted to the left in the shift register 6. The erased weighing machine numbers and flags are then sequentially stored from the righthand end of the shift register 6. The weighing machine numbers and flags of the weighing machines to be selected are therefore rotated in the shift register 6. This makes it possible to make the frequency of use of the weighing machines uniform.

When weighing machines to take part in a combinatorial weighing operation are thus selected, the weighing machine numbers of the selected weighing machines are delivered from the selector 5 via a second multiplexer 11 into the combinatorial computing unit 2.

Based on this input signal, the combinatorial computing unit 2 issues the combination command signal S3 indicative of the selected weighing machines to the first multiplexer 3, and successively receives the weighing data from the selected weighing machines via the A/D converter 4. The received weighing data are then temporarily stored in a register in the combinatorial computing unit 2, and then combined in a prescribed sequence to determine a weight combination equal to a preset value or greater than and closest to the preset value, the preset value being provided by a setting unit 12. When the combinatorial computation is over, the combinatorial computing unit 2 issues a computation end signal as a clear signal S6 to the shift register 6 and the memories 8, 9, 10 to clear all of the flags stored therein. Thus, each combinatorial computing operation puts an end to one cycle of operation of weighing machines.

When all flags are cleared after the combinatorial computing operation, the weighing data stored in the register in the combinatorial computing unit 2 are transferred to an empty detector 13 which detects an empty machine supplied with no articles among the weighing machines that participated in the combinatorial weighing. The detection of any empty weighing machine is effected each time one combinatorial computing operation is finished. Alternatively, the detection may be carried out each time a certain number of combinatorial computing operations are completed. If there is any empty weighing machine detected, the empty detector 13 generates an empty detection signal S4 which sets an empty flag in the storage location for the empty weighing machine in the empty memory 8.

After the empty weighing machine has been detected, the combinatorial computing unit 2 issues the determined combination of total weights equal or closest to the preset value to a comparator 14. The comparator 14 determines whether the supplied weight combination falls within an allowable preset range defined by upper and lower limits set by upper and lower setting units 15, 16.

If the weight combination falls in the allowable preset range, the comparator 14 applies an acceptance signal Sok to AND gates 17 associated respectively with the weighing machines giving the weight combination, thereby opening the AND gates 17. These weighing machines are then supplied with the discharge command signal S1 to discharge the articles from their weighing hoppers. The discharge command signal S1 is also applied to the discharge memory 9 to set discharge flags indicative of discharged conditions in the storage locations for the weighing machines. This removes the weighing machines which have just discharged articles from the combination of weighing machines in the next combinatorial weighing operation.

The acceptance signal Sok is also applied to a timer circuit T0 identical in construction to the timer circuits T1 through T15. Upon elapse of a given interval of time, the timer circuit T0 delivers an article supply command signal S2' to AND gates 18 associated respectively with the weighing machines. At this time, the AND gate 18 corresponding to the empty weighing machine is supplied with the empty flag from the empty memory 8. Therefore, the supply command signal S2' from the timer circuit T0 is given to the supply unit corresponding to the empty weighing machine through an OR gate 19. The empty weighing machine is accordingly supplied with a batch of articles at the same time as weighing machines which have discharged their articles are supplied with new batches of articles.

The acceptance signal Sok is also applied to a delay circuit 20 which, upon elapse of a preset period of time, issues an operation command signal S7 to the register controller 7 via an OR gate 21. The register controller 7 is responsive to the operation command signal S7 for controlling the shift register 6 to shift the weighing machine numbers and their flags for a next weighing machine combination.

If the weight combination is below the allowable preset range, then the comparator 14 produces an under signal Sun that is applied via an OR gate 22 to an empty flag detector 23. More specifically, when the weight combination is smaller than the allowable preset range, the weighing machine with an empty flag set up therefor is first detected to find the cause of such a failure.

The empty flag detector 23 is supplied at all times with flag information from the empty memory 8. In response to the under signal Sun, the empty flag detector 23 detects whether there is any empty weighing machine having an empty flag set up therefor based on the flag information. If there is an empty weighing machine detected, then the empty flag detector 23 supplies, via the OR gate 19, an article supply command signal S2'' to the supply unit for the detected empty weighing machine, and then issues a detection end signal or an operation command signal S8 via the OR gate 21 to the register controller 7 for starting the operation of the latter to shift the weighing machine numbers and their flags for a next weighing machine combination.

If there is no weighing machine with an empty flag set up therefor, then the empty flag detector 23 delivers a command signal S9 to a lightweight detector 24 for starting operation of the latter. The lightweight detector 24 is supplied with the weighing machine numbers of the weighing machines having participated in the combinatorial weighing and their weighing data from the combinatorial computing unit 2. In response to the command signal S9, the lightweight detector 24 detects a suitable number, three for example, of weighing machines giving smaller weight values than other weighing data. Then, the lightweight detector 24 issues an additional article supply signal S5 via the OR gate 19 to the supply units for the detected weighing machines for thereby supplying additional articles to the detected weighing machines. This eliminates any insufficient number of articles supplied which has caused the failure of finding a proper combination of article weights. To prevent the detected weighing machines from being selected as part of the combination of weighing machines to take part in a next combinatorial weighing operation, the additional supply signal S5 is also supplied to the addition memory 10 to set addition flags in the storage location for the detected weighing machines. Thereafter, the lightweight detector 24 applies a command signal S10 via the OR gate 21 to the register controller 7 for starting operation of the register controller 7.

Accordingly, when any combination of total weights is below the allowable preset range, an empty weighing machine, if any, is supplied with a batch of articles. If there is no such empty weighing machine, those weighing machines which give smaller article weights are supplied with additional articles. Any insufficient supply of articles to weighing machines which has brought about such a weighing failure, is therefore rectified.

When a combination of total weights is greater than the allowable preset range, no articles are additionally supplied to weighing machines since such a weight combination is highly likely to be occasioned by an excessive supply of articles. To correct such a situation, a new combination of weighing machines is selected out of all of the weighing machines for a next combinatorial weighing operation, the combinatorial computing operation is performed on weighing data from this new combination of weighing machines.

There are various methods of newly selecting combined weighing machines. According to the illustrated embodiment, the fifteen weighing machines W1 through W15 are divided into three groups A, B, C each composed of five weighing machines, and two out of the three groups are selected for combinatorial weight computation.

More specifically, if a weight combination is larger than the allowable preset range as a result of comparison in the comparator 14, then the comparator 14 issues an over signal Sov to a grouping controller 25. The grouping controller 25 selects two out of the three groups A, B, C in response to the input over signal Sov, and delivers the selected weighing machine numbers as a designation signal S11 through the second multiplexer 11 to the combinatorial computing unit 2 so that the selected weighing machines will be designated as those to take part in a next combinatorial weighing operation. The designation signal S11 is issued from the grouping controller 25 in synchronism with a computation start signal S0 applied thereto.

The computation start signal S0 is generated by a packaging machine (not shown), operatively connected to the combinatorial weighing system, in synchronism with an article request signal from the packaging machine. The computation start signal S0 is supplied to the combinatorial computing unit 2 and the grouping controller 25.

The designation signal S11 from the grouping controller 25 is allowed to enter the combinatorial computing unit 2 by a signal switching control signal S12. The acceptance signal Sok and the under signal Sun are applied as operation release signals via an OR gate 26 to the grouping 25. The grouping controller 25 does not designate the weighing machines which participate in the next combinatorial weighing operation when any combination of total weights falls within or is below the allowable preset range. If any weight combination remains larger than the allowable preset range as a result of comparison in the comparator 14 after all combinations of the weighing machines have been executed under the control of the grouping controller 25, then the grouping controller 25 generates an operation command signal S13 for entering the foregoing mode of operation to detect an empty weighing machine.

Operation of the apparatus shown in FIG. 1 will be described with reference to FIGS. 2 and 3.

At an initial stage, the data stored in the shift register 6 and the memories 8, 9, 10 are all cleared, and then the weighing machine numbers, 1 through 15, are sequentially stored in the shift register 6.

Thereafter, the selector 5 selects up to ten weighing machines with no flag set therefor. Since there is no flag set at the initial stage, the weighing machines with numbers 1 through 10, that is, the weighing machines W1 through W10, are selected for a first cycle of combinatorial computation. When the computation start signal S0 is supplied from the packaging machine, the combinatorial computing unit 2 performs combinatorial weight computation on the selected weighing machines.

When the combinatorial weight computation is over, the computation end signal is issued from the combinatorial computing unit 2 to clear the flags in the shift register 6 and the memories 8, 9, 10. Then, weighing data D1 through D10 in the combinatorial computing unit 2 are transferred to the empty detector 13.

The empty detector 13 detects whether the weighing machines are empty or not based on the weighing data D1 through D10. Since all of the weighing machines W1 through W10 are empty during the initial stage, they are all detected as empty, and empty flags are set in storage locations of the empty memory 8 for the selected weighing machines.

A combination of total weights as found by the combinatorial computing unit 2 is delivered to the comparator 14 which then determines whether the weight combination falls within an allowable preset weight range. Naturally, the weight combination is below the allowable preset range. Therefore, the comparator 14 issues the under signal Sun through the OR gate 22 to the empty flag detector 23.

The empty flag detector 23 serves to detect any empty weighing machines based on the flag information stored in the empty memory 8. If there is any empty weighing machine or machines, then the empty flag detector 23 delivers the article supply command signal S2″ to the supply unit or units for the empty weighing machine or machines. At the initial stage, the supply command signal S2″ is fed to the supply units F1 through F10 for the weighing machine numbers from 1 through 10. Accordingly, all of the weighing machines W1 through W10 selected for combinatorial weighing operation are supplied with batches of articles in a first cycle of article supply.

When the empty flags have been detected, the detection end signal S8 is applied as an operation start signal to the register controller 7. The register controller 7 then shifts the weighing machine numbers and their flags in the shift register 6 for a next combinatorial weighing operation. More specifically, the unselected weighing machine numbers 11 through 15 and their flags are moved to the left in the shift register 6, and the selected weighing machine numbers 1 through 10 and their flags are stored in the righthand empty storage locations in the shift register 6. In the illustrated embodiment, empty flags are set in flag storage locations for the weighing machine numbers 1 through 10.

Then, the selector 5 selects the weighing machine numbers of a maximum of ten weighing machines with no empty flags. In the illustrated embodiment, the weighing machine numbers 11 through 15 are selected. The weighing machines of the selected weighing machine numbers are designated for a second combinatorial weighing operation, and weighing data D11 through D15 from the selected weighing machines are delivered to the combinatorial computing unit 2.

In response to the computation start signal S0 from the packaging machine, the combinatorial computing unit 2 executes combinatorial weight computation to find a combination of total weights closest to a preset value. Since the selected weighing machines W11 through W15 are all empty at this time, they are then supplied with batches of articles in the same manner as described above. All of the empty flags stored in the shift register 6 and the empty memory 8 are cleared after the foregoing combinatorial weight computation. Therefore, the weighing machines W1 through W10 selected in the first cycle of combinatorial weighing operation now becomes selectable for a third cycle of combinatorial weighing operation.

In the third cycle of combinatorial weighing operation, the ten weighing machines W1 through W10 are selected to take part in combinatorial computation. Then, the combinatorial computation is effected, all flags are cleared, any empty weighing machines are detected. Subsequently, the comparator 14 ascertains whether the total weight as combined by the combinatorial computing unit 2 falls within an allowable preset range or not.

If the weight combination is within the allowable preset range, then the combinatorial computing unit 2 issues the article discharge command signal S1 to those weighing machines which give such weight combination, thereby enabling the weighing machines to discharge articles. Upon elapse of a given interval of time, the weighing machines thus emptied and any empty weighing machines that have already been detected are supplied with batches of articles.

If the weight combination is below the allowable preset range, then the program enters a loop beginning with (iii) in FIG. 2.

The empty flag detector 23 detects whether there are weighing machines with empty flags set therefor in the empty memory 8. If any, then empty weighing machines are supplied with batches of articles. If not, then the lightweight detector 24 is enabled to detect a suitable number, three for instance, of weighing machines having smaller weighing data out of all weighing machines that have participated in the combinatorial weighing operation, and the detected weighing machines are supplied with additional articles.

Figure 3:
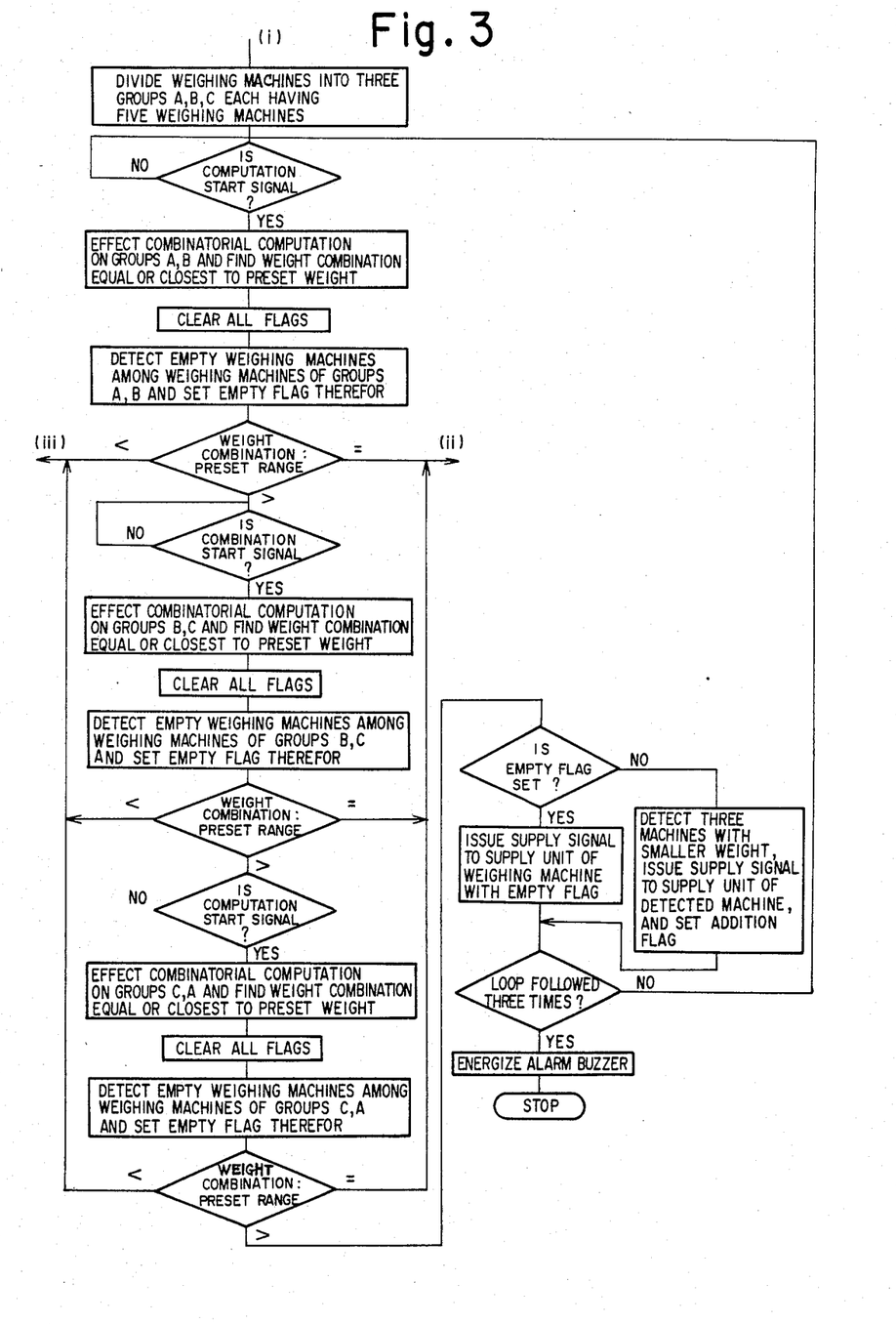

If the weight combination is greater than the allowable preset range, then the program goes to a loop beginning with (i) shown in FIG. 3.

More specifically, the grouping controller 25 divides the fifteen weighing machines W1 through W15 into the three groups A, B, C, and designates the two groups A, B as the weighing machines to take part in the second cycle of combinatorial weighing operation. In response to the computation start signal S0, the combinatorial computing unit 2 effects combinatorial computation on the weighing data from the weighing machines in the groups A, B to find a combination of weights closest to the preset value. Upon completion of the combinatorial computation, the combinatorial computing unit 2 issues the computation end signal to clear the flags set in the shift register 6 and the memories 8, 9, 10, and then enables the empty detector 13 to detect any empty weighing machine.

Thereafter, the weight combination as determined by the combinatorial computing unit 2 is applied to the comparator 14 which determines whether the weight combination falls within the allowable preset range or not.

Figure 2:
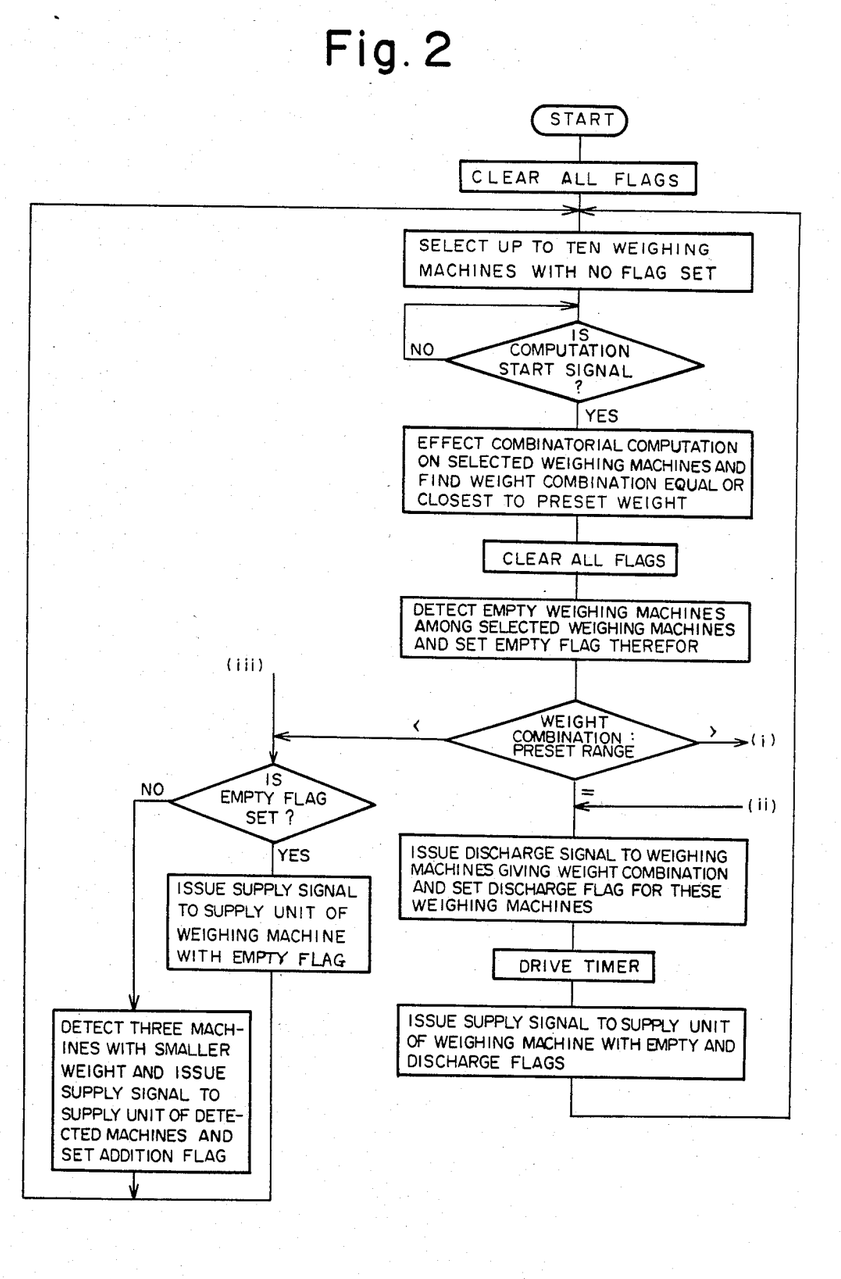
FIGS. 2 and 3 are a flowchart for describing the operation of the apparatus shown in FIG. 1.

If in the allowable preset range, then the program goes to a loop (ii) illustrated in FIG. 2. If below the range, then the program enters the loop (iii) of FIG. 2. If above the range, then the program proceeds along the flowchart of FIG. 3 to effect another combinatorial weighing operation on the weighing machines in the two groups B, C in response to a next computation start signal S0. The computation end signal is then used to clear the flags set in the shift register 6 and the memories 8, 9, 10. Thereafter, any empty weighing machines are detected, and the comparator 14 determines whether a weight combination as found falls in the allowable preset range.

The foregoing procedure, including selection of weighing machines, combinatorial computation, clearing of all flags, detection of any weighing machines and other operations, is repeated to perform a combinatorial weighing operation on the groups C, A of weighing machines. If the weight combination as found remains still higher than the allowable preset range, then the same process as in the loop (iii) of FIG. 2 is followed to change the weighing data from the weighing machines in the groups C, A. Thereafter, a combinatorial weighing operation is effected on weighing data from the weighing machines in the groups A, B.

In this manner, the groups A, B of weighing machines, the groups B, C of weighing machines, and the groups C, A of weighing machines are successively combined for finding weight combinations. However, if such weight combinations determined through three different combinations of weighing mahines have turned out greater than the allowable preset range, it is judged that a proper weight combination can no longer be available. The grouping controller 25 then issues a signal S14 for energizing an alarm 27 to stop all operation of the combinatorial weighing system.

Figure 4:
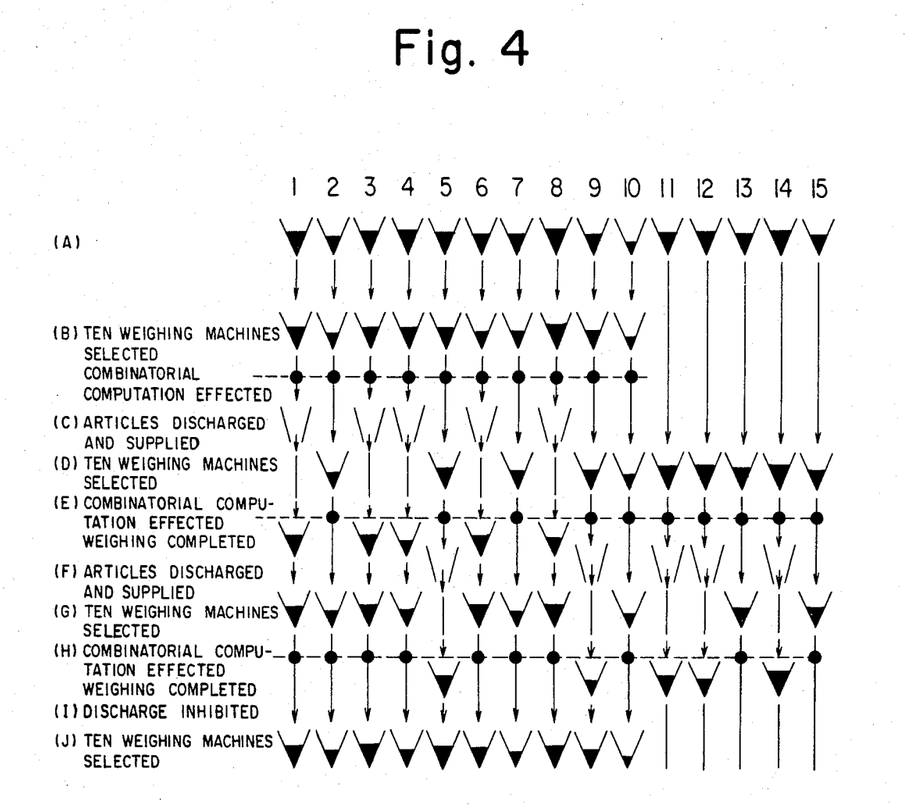
FIG. 4 is a schematic diagram showing successive cycles of combinatorial weighing operations according to the present invention.

A method according to a second embodiment of the present invention will be described with reference to FIG. 4. FIG. 4 shows at A fifteen weighing machines all supplied with articles. At (B), ten out of the fifteen weighing machines are selected for a next combinatorial weighing operation. Combinatorial computation is then effected on the selected weighing machines, and articles are discharged at (C) from those weighing machines (weighing machine numbers 1, 3, 4, 6 and 8 in the illustrated embodiment) which give a combination of weights falling within an allowable preset range. At (D) and (G), ten weighing machines are selected for the current combinatorial computation cycle from those weighing machines which have not taken part in the previous combinatorial weighing operation and those which have participated in the previous combinatorial computation cycle but have discharged no articles. If eleven or more weighing machines are available for combinatorial computation, then up to ten out of these eligible weighing machines are selected. If only nine or fewer weighing machines are combinable for combinatorial weighing, then all of them are selected. The weighing machines that have discharged their articles in the previous cycle of combinatorial weighing operation are immediately supplied with new batches of articles so as to be able to take part in a combinatorial computation cycle following the current cycle.

According to the present invention, when there cannot be found any combination of weighing machines which give a total weight combination falling within an allowable preset range, those weighing machines which have discharged their articles in a previous combinatorial computation cycle are supplied batches of articles again, and then a new combination of weighing machines is selected from all of the weighing machines for a next (i.e., the following) cycle of combinatorial computation.

In FIG. 4 at (H), no such combination of weighing machines can be found which give a total weight combination falling within an allowable preset range. When this happens, no batches of articles are discharged, and those weighing machine (weighing machines numbers are 5, 9, 11, 12 and 14) which have discharged their articles in the previous combinatorial computation cycle are supplied batches of articles again. Thereafter, a new combination of weighing machines for a next cycle of combinatorial computation is selected from all of the weighing machines in a next step (J) of weighing machine selection.

As described above, no combinatorial including discharged weighing machines, computation is carried out until the weighing machines which have discharged articles in the previous cycle, are supplied with articles again. This is done in order to prevent article weighing cycles from being disturbed and to maintain as many weighing machines as necessary to perform combinatorial computation with a sufficient degree of accuracy. A new combination of weighing machines is selected from all of the weighing machines for a next combinatorial weighing operation in order to any failure of providing a desired weight combination.

With this arrangement, therefore, a suitable weight combination can be found in the next cycle without disturbing desired article weighing cycles. Normal weighing operations can thus be restored speedily without reducing the overall rate of weighing operation. Simultaneously with the foregoing process, those weighing machines which give smaller weighing data, that is, supply insufficient numbers of articles, are detected among all of the weighing machines that have participated in a combinatorial computation operation, and the detected weighing machines are supplied with additional articles in a next article supplying cycle. Accordingly, insufficient article supply which would lead to the failure of providing a desired weight combination can also be corrected without interrupting any article weighing cycles.

Figure 5:
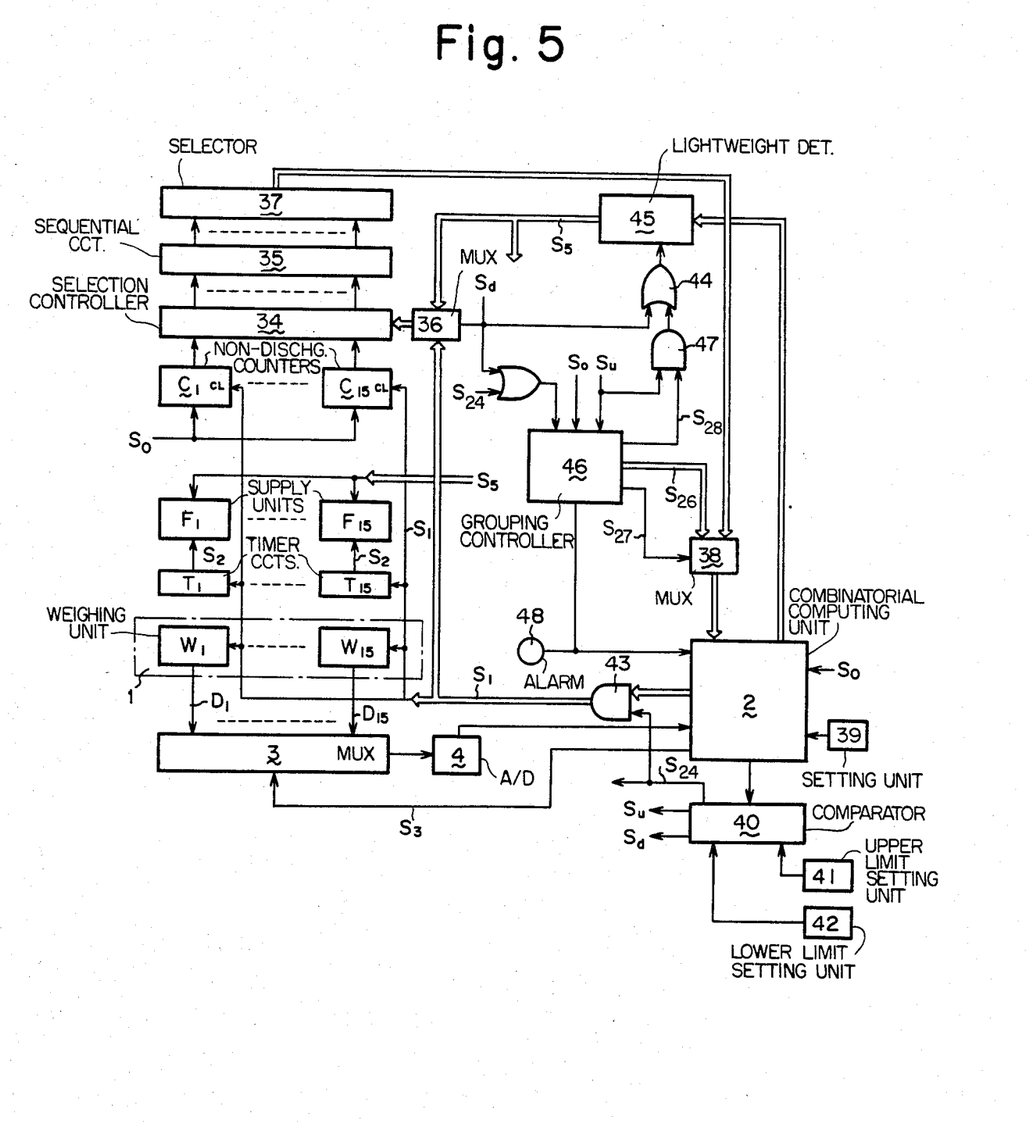
FIG. 5 is a block diagram of an apparatus for effecting a combinatorial weighing method according to another embodiment of the present invention, for selecting weighing machines in a next cycle of combinatorial weighing operation if no weight combination can be found in an allowable preset range.
Figure 6:
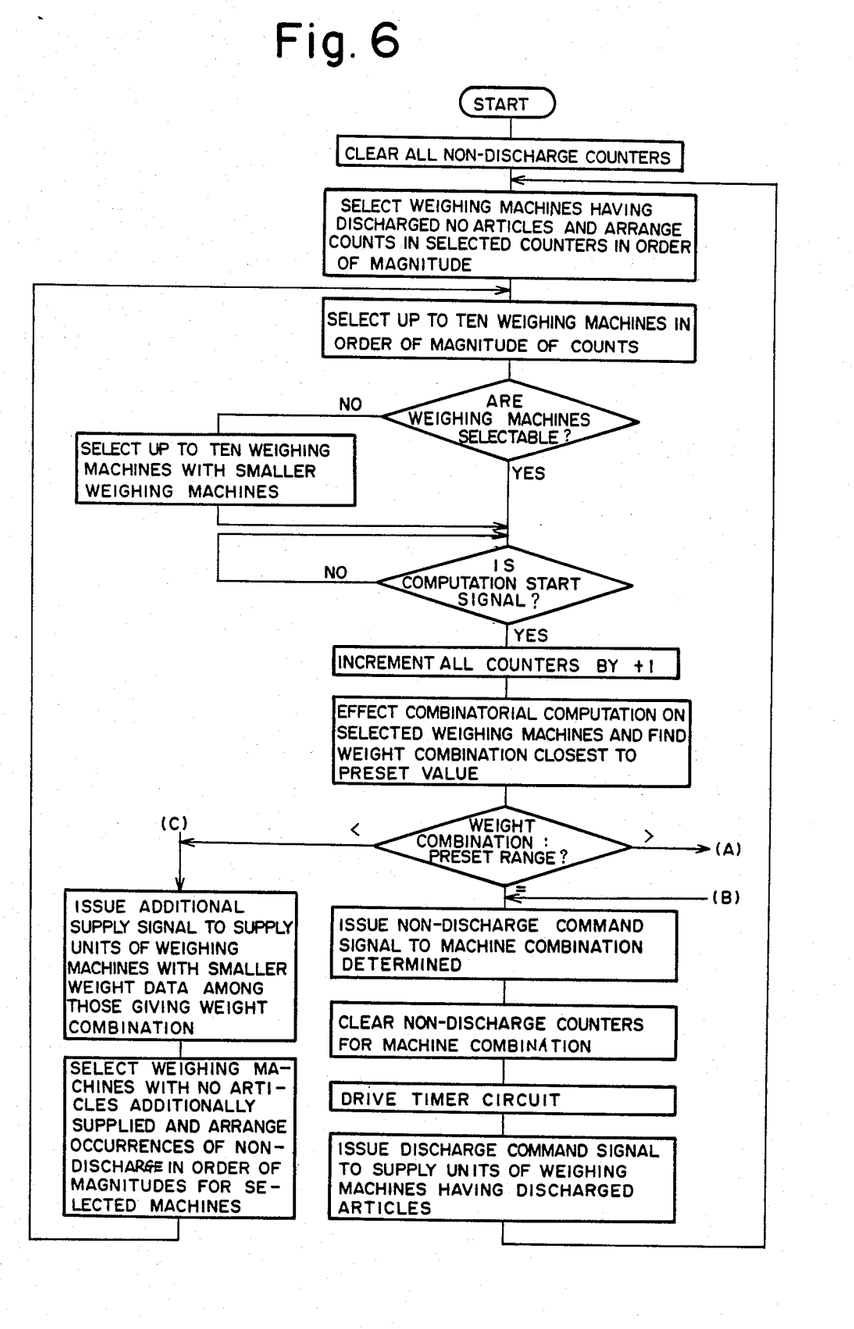
FIGS. 6 and 7 are a flowchart for describing the operation of the apparatus illsutrated in FIG. 5.
Figure 7:
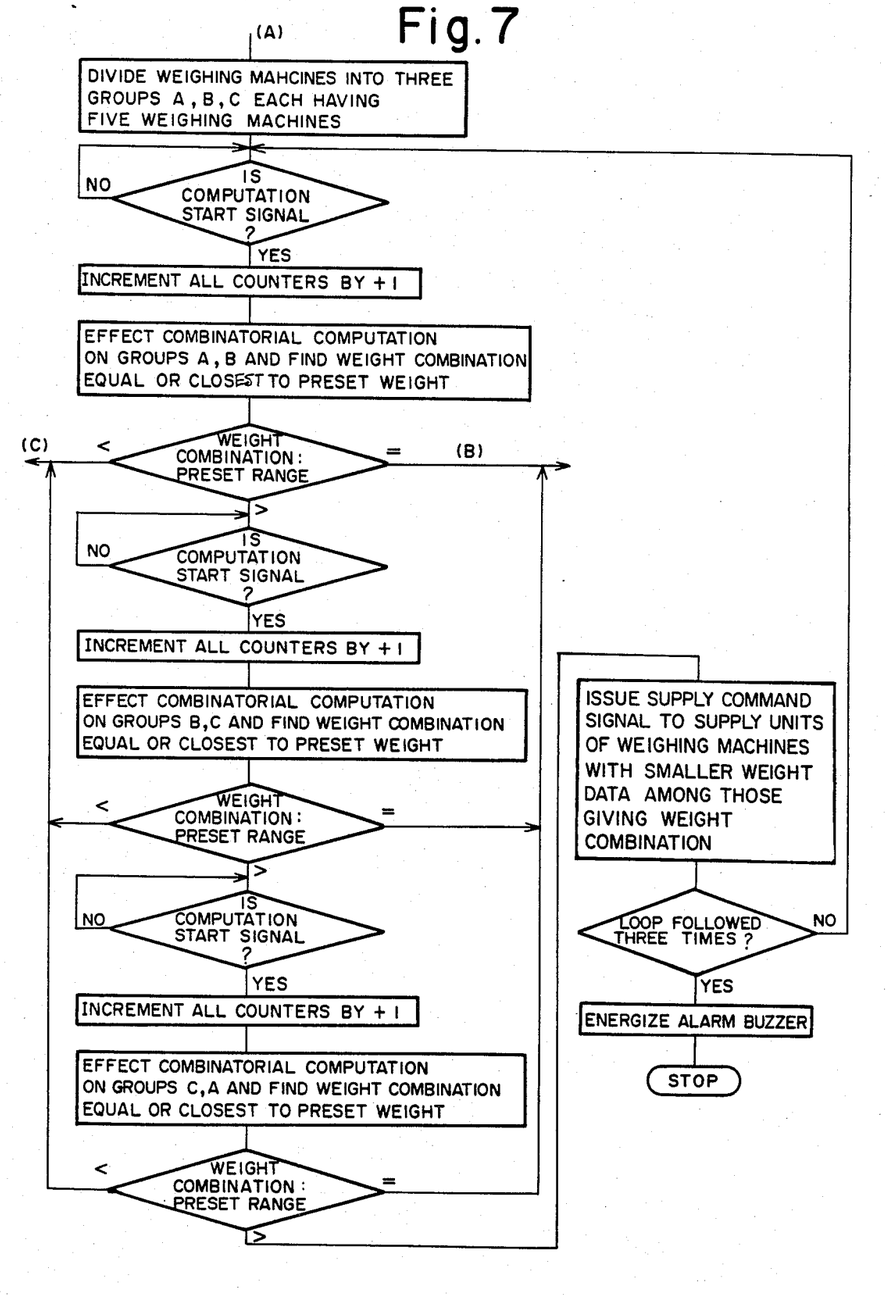

FIG. 5 illustrates in block form an apparatus for carrying out a method according to another embodiment of the present invention, and FIGS. 6 and 7 are a flowchart showing operations of the apparatus shown in FIG. 5.

In FIG. 5, the apparatus has a weighing unit 1 comprising a plurality (fifteen, for example) of weighing machines W1 through W15 circularly arranged at angularly equal intervals. The weighing machines W1 through W15 issue weighing data D1 through D15, discharge batches of articles from their weighing hoppers (not shown) in response to a discharge command signal S1 from a combinatorial computing unit 2, and are supplied with batches of articles from supply units F1 through F15, respectively, a preset interval of time after the articles have been discharged. The supply units F1 through F15 are associated respectively with the weighing machines W1 through W15, and responsive to a supply command signal S2 from timer circuits T1 through T15 for supplying batches of articles to the weighing hoppers of the corresponding weighing machines.

The timer circuits T1 through T15 serve to provide a certain difference between the time when the weighing hoppers start discharging articles and the time when the weighing hoppers start being supplied with articles. The timer circuits T1 through T15 are energizable in response to the discharge command signal S1 and, upon elapse of a given interval of time, issue the supply command signal S2.

The combinatorial computing unit 2 issues a combination command signal S3 which designates certain weighing machines among the weighing machines W1 through W15. Weighing data from the designated weighing machines are successively delivered through a first multiplexer 3 to an A/D converter 4. The data are then converted by the A/D converter 4 into corresponding digital quantities which sequentially enter the combinatorial computing unit 2. The weighing data D1 through D15 are selectively supplied to the combinatorial computing unit 2 by applying the combination command signal S3 to the first multiplexer 3 to enable the latter to transfer the weighing data from the designated weighing machines successively to the combinatorial computing unit 2. When the weighing machines W1 through W15 are to be selected, priority is given to up to ten weighing machines which have discharged articles less frequently among those weighing machines which have not discharged articles in a previous cycle of combinatorial weighing operation. The number of occurrences in which each of the weighing machines W1 through W15 fails to discharge articles is counted by a corresponding one of non-discharge counters C1 through C15 associated respectively with the weighing machines W1 through W15.

A combinatorial computation start signal S0 is applied to the non-discharge counters C1 through C15 which count the number of occurrences of non-discharge in response to the combinatorial computation start signal S0. When articles are discharged from a weighing machine, the discharge command signal S1 is also applied to the non-discharge counter for that weighing machine to clear the count in the non-discharge counter to zero. Therefore, the non-discharge counter continues to count the number of occurrences of non-discharge each time the combinatorial computation signal S0 is applied, unless and until the discharge command signal S1.

The counts from the non-discharge counters C1 through C15 are delivered to a selection controller 34 from which the counts indicative of occurrences of non-discharge in the corresponding weighing machines are selectively output to a sequential circuit 35.

The counts in the selection controller 34 are selected by entering the discharge command signal S1 supplied to weighing machines specified for article discharge into the selection controller 34 through a second multiplexer 36.

The sequential circuit 35 serves to arrange the supplied counts in the order of magnitude, and deliver the arranged counts and corresponding weighing machine numbers (allotted respectively to the weighing machines W1 through W15 to identify them) to a selector 37.

The selector 37 is responsive to this input signal for selecting a fixed number of weighing machines (up to ten when eleven or more weighing machines are available) among those weighing machines with fewer occurrences of non-discharge, and designating the selected weighing machines as those for a next combinatorial computation cycle in the combinatorial computing unit 2 through a third multiplexer 38. If there are a plurality of weighing machines which have not discharged articles for the same length of time, those weighing machines with smaller weighing machine numbers are selected.

The combinatorial computing unit 2 temporarily stores in its register (not shown) the weighing data D1 through D15 successively fed from the A/D converter 4, combines the weighing data in a predetermined sequence to find one weight combination closest to a preset value given from a setting unit 39, and delivering the determined weight combination value to a comparator 40. At this time, a weight combination equal to, or closest to the preset value and greater than the preset value can be assured by setting the preset value equal to the lower limit of an allowable preset range. The combinatorial computing unit 2 starts the combinatorial computation in response to an article discharge request signal supplied as the computation start signal S0 from a packaging machine (not shown) operatively associated with the weighing apparatus.

The comparator 40 serves to compare the total weight combination thus supplied with upper and lower limits given from upper and lower limit setting units 41, 42 to thereby determine whether the total weight combination falls within an allowable preset range. If the total weight combination falls within the allowable preset range, then the comparator 40 issues an acceptance signal 524 to AND gates 43 associate with those weighing machines which give such total weight combination, thereby opening the AND gates 43. The article discharge command signal S1 is thus supplied from the combinatorial computing unit 2 to the weighing machines.

If the total weight combination is greater or smaller than the allowable preset range, then no articles are discharged and the following steps are followed: Any total weight combination smaller than the allowable preset range is likely to be caused by an insufficient supply of articles to the weighing machines W1 through W15. When the total weight combination is smaller than the allowable preset range, the comparator 40 produces an under signal Sd that is delivered through an OR gate 44 to a lightweight detector 45 which serves to search for any weighing machines which have been supplied with insufficient articles. The lightweight detector 45 is supplied at all times with the weighing machine numbers participating in the combinatorial weighing operation and weighing data corresponding to the weighing machine numbers from the combinatorial computing unit 2. When the under signal Sd enters the lightweight detector 45, the latter responds to this signal to start detecting at least one weighing machine having the smallest weighing data. Alternatively, a predetermined reference weight value may be set up, and all weighing machines giving weighing data failing to reach the reference weight value may be detected.

When any weighing machine with an insufficient supply of articles is detected, the lightweight detector 45 issues an additional article supply signal S5 to the supply unit of the detected weighing machine, and simultaneously to the selection controller 34 via the second multiplexer 36 to prohibit the detected weighing machine from taking part in the next (i.e., current) cycle of the combinatorial weighing operation. The additional article supply is effected in timed relation to the supply of articles into the weighing hoppers. The weighing machine with articles additionally supplied is rendered available the cycle cycle of the combinatorial weighing operation following the next cycle.

The allowable preset range can be exceeded by any total weight combination when excessive articles are supplied to the weighing machines W1 through W15. If the total weight combination is greater than the allowable preset range, then those weighing machines which have discharged their articles are supplied with articles again and issue weighing data; and thereafter, a new combination of weighing machines is selected among all of the weighing machines for the next cycle of combinatorial weighing operation.

Various processes for selecting such a new combination of weighing machines may be considered. In the illustrated embodiment, the fifteen weighing machines W1 through W15 are divided into three groups A, B, C each including five weighing machines. Two out of the three groups A, B, C are selected for combinatorial computation. If the weight combination determined is larger than the allowable preset range, then the comparator 40 issues an over signal Su to a grouping controller 46. The grouping controller 46 is responsive to the over singal Su for selecting two out of the three groups A, B, C to produce a designation signal S26 indicating the selected weighing machines which will participate in a next cycle of combinatorial weighing operation. The designation signal S26 is fed through the third multiplexer 58 to the combinatorial computing unit 2 in synchronism with the next computation start signal S0.

Designated in FIG. 5 at S27 is a signal switching control signal generated by the grouping controller 46 to enable the third multiplexer 38 to apply the designation signal S26 to the combinatorial computing unit 2. The grouping controller 46 is supplied with the acceptance signal S24 or the under signal Sd as a release signal. In response to this release signal, the grouping controller 46 is de-energized when the total weight combination falls within or is smaller than the allowable preset range.

Operation of the apparatus shown in FIG. 5 will be described with reference to FIGS. 6 and 7.

At an initial stage, the counts in the non-discharge counters C1 through C15 are cleared to zero, and then those weighing machines which hava not discharged articles are selected by the selection controller 34. Then, the counts in the counters corresponding to the selected weighing machines are arranged in a sequential order by the sequential circuit 35. The selector 37 then selects up to ten weighing machines with larger counts. Since at the initial stage the counts are all zero, ten successive weighing machines with smaller weighing machine numbers are selected.

In response to the computation start signal S0 from the packaging machine, the non-discharge counters C1 through C15 start counting up, and combinatorial computation is effected on weighing data from the ten selected weighing machines W1 through W10. All of the weighing hoppers of the weighing machines are empty at this time, and hence the comparator 40 generates the under signal Sd. The weighing machine with the smallest weighing data is detected by the lightweight detector 45, which issues the additional article supply signal S5 to the supply unit of the detected weighing machine.

The detected weighing machine is supplied with articles during a next cycle of combinatorial computation. During this time, the lightweight detector 45 may also detect the empty weighing hoppers so that the selected ten weighing machines W1 through W10 can be supplied with batches of articles in a next step of article supply. Such an additional article supply operation is effected not only at the initial stage, but also when any total weight combination determined by the combinatorial computing unit 2 as being closest to the preset value becomes smaller than the allowable preset range during operation.

For a next cycle of combinatorial computation, up to ten weighing machines are selected according to the foregoing process from the weighing machines other than those which have been additionally supplied with articles, and the next combinatorial computation is effected on weighing data from the selected weighing machines. For example, when ten weighing machines W1 through W10 are designated as the ones to be additionally supplied with articles as a result of the preceding combinatorial computation, the remaining five weighing machines W11 through W15 are specified as taking part in the combinatorial computation in the next cycle, and combinatorial computation is carried out on weighing data from these five weighing machines. Since the weighing hoppers of these five weighing machines W11 through W15 are still empty, the next combinatorial weighing operation is initiated by following the same procedure as described above.

In the next combinatorial weighing cycle, no articles are discharged from any of the weighing machines W11 through W15, and hence the ten weighing machines W1 through W10 with the weighing machine numbers 1 through 10 are selected for the next cycle. Before the computation start signal S0 is applied, the ten weighing machines W1 through W10 have already been supplied with additional articles and have completed their article weighing operation.

If the total weight combination resulting from the combinatorial computation falls within the allowable preset range, then the discharge command singal S1 is applied to the weighing machines which combine to give the total weight combination, and at the same time to the non-discharge counters corresponding to those weighing machines to clear the counts in the non-discharge counters. Upon elapse of a given period of time, the article supply command signal S2 is fed to the supply units of the weighing machines which have discharged their articles, thereby supplying batches of articles to the weighing hoppers of these weighing machines.

In synchronism with the issuance of the discharge command signal S1, weighing machines to take part in a next cycle of combinatorial weighing are selected from the weighing machines other than those having discharged articles in the preceding cycle as described above, and combinatorial computation is effected on weighing data from the selected weighing machines in response to the next computation start signal S0.

If the total weight combination determined by the combinatorial computing unit 2 as being closest to the preset value is greater than the allowable preset range, then no articles are discharged, and the program enters a loop as illustrated in FIG. 7.

The grouping controller 46 divides the fifteen weighing machines W1 through W15 into three groups A, B, C, and specifies the two groups A, B as the weighing machines for a next cycle of combinatorial computation. Combinatorial computation is effected on the weighing machines of the groups A, B in response to the computation start signal S0. If the resultant total weight combination closest to the preset value falls within the allowable preset range, then the program goes back to the normal routine as shown in, FIG. 6. If the total weight combination is below the allowable preset range, then the program enters the loop of FIG. 6 in which additional articles are supplied to weighing machines. If the total weight combination is greater than the allowable preset range, then next combinatorial computation is effected on weighing data from the weighing machines of the groups B, C in response to a next computation start signal S0. If a resulting total weight combination is larger than the allowable preset range, then next combinatorial computation is performed on weighing data from the weighing machines of the groups C, A to thereby produce a total weight combination. If the latter total weight combination still remains greater than the allowable preset range, then the lightweight detector 45 detects those weighing machines having smaller weighing data among the groups A, C, and additional articles are supplied to the detected weighing machines, thereby changing weighing data. The lightweight detector 45 is operated in response to an operation command provided by ANDing the over signal Su and a combinatorial computation end signal S28 for the groups A, C with an AND gate 47.

If the total weight combination is still larger than the allowable preset range after the foregoing cycle of combinatorial computation using the groups (A, B), (B, C) and (C, A) has been completed, then combinatorial computation is effected again on the varied weighing data from the weighing machines of the groups A, B. When the total weight combination still exceeds the allowable preset range after having performed the above cycle with the groups (A, B), (B, C) and (C, A) three times, it is determined that any suitable weight combination is no longer available. In this case, an alarm 48 is energized to stop all operations of the weighing apparatus in response to a signal generated by the grouping controller 46. The combinatorial computing unit 2 is also de-energized by the signal from the grouping controller 46.

While in the foregoing embodiments combinatorial weighing is illustrated, the present invention is also applicable to combinatorial counting which is normally performed by dividing a total combined weight by a unit weight.

As described with reference to the first embodiment of the present invention, weighing machines with no articles supplied thereto are detected among those which are to take part in a combinatorial weighing operation each time the combinatorial computation is performed, and if there is any unsupplied weighing machine detected, then a batch of articles is supplied to the detected weighing machine. Accordingly, any empty weighing machines can immediately be eliminated. Therefore, weighing machines available for combinatorial computation are rendered substantially more effective with a resulting increased degree of accuracy of combinatorial computation.

According to the second embodiment, when there can be found no combination of weighing machines which give a total weight combination falling within an allowable preset range in a current cycle of combinatorial weighing operation, a new combination of weighing machines for the following cycle will be selected from all weighing machines, after those weighing machines which have discharged articles are supplied with articles again and have issued weighing data. This allows a combination of totalled weights falling within the allowable preset range to be found quickly in the following cycle of combinatorial weighing operation without disturbing any article weighing cycles. If the total weight combination is smaller than the allowable preset range, then weighing machines with smaller weighing data are detected among the weighing machines which have participated in the combinatorial weighing operation, and the detected weighing machines are supplied with additional articles. Therefore, any insufficient supply of articles can be corrected which would lead to a failure of finding any weight combination falling in the preset range.

Although certain preferred embodiments have been shown and described, it should be understood that many changes and modifications may be made therein without departing from the scope of the appended claims.

What we claim is:

1. A combinatorial measuring apparatus for combining weighing data from a plurality of weighing machines having hoppers to find a total weight combination closest to a preset value within an allowable preset range, and to discharge articles from the weighing machines which are combined to give such a total weight combination through cycles of combinatorial computation, said combinatorial measuring apparatus comprising:

means, associated with the weighing machines, for supplying batches of articles to the hoppers of the weighing machines in response to a supply command signal;

means for generating the supply command signal by providing a time difference between the time when the hoppers start discharging articles and the time when the hoppers are supplied with articles;

the weighing machines including weighing means, responsive to a discharge command signal, for discharging articles from the hoppers, for being supplied with articles from said supplying means upon elapse of an interval of time after the articles have been discharged, and for generating weighing data;

a shift register, operatively connected to the weighing machines, for storing, in pairs, weighing machine numbers allotted respectively to the weighing machines and flags indicative of operating conditions of the weighing machines;

selector means, operatively connected to said shift register, for receiving the weighing machine numbers and the flags from said shift register, for determining which of the weighing machines are discharging and which are being supplied with articles based on the stored weighing machine numbers and flags, and for selecting a prescribed number of the weighing machines from those weighing machines which are neither discharging nor being supplied with articles;

a plurality of memory means associated respectively with said weighing machines and each comprising an empty memory, a discharge memory, and an addition memory for storing, as the flags, an empty detection signal, the discharge command signal, and an additional supply signal, respectively;

shift register control means, operatively connected to said shift register and said plurality of memory means, for detecting the weighing machine numbers of empty weighing machines, the weighing machine numbers of weighing machines designated to discharge articles, and the weighing machine numbers of weighing machines designated to be supplied with additional articles, based on the flags stored in said empty memory, said discharge memory, and said addition memory, for clearing the detected weighing machine numbers and corresponding flags in said shift register in response to such detection, for shifting the uncleared weighing machine numbers and flags successively to storage locations in said shift register from which the data have been cleared, and for storing weighing machine numbers and corresponding flags detected from said memories into storage locations in said shift register from which the data have been shifted;

a first multiplexer;

a second multiplexer operatively connected to receive a machine selection signal;

combinatorial computing means, operatively connected to said first and second multiplexers, for receiving the machine selection signal which is indicative of the weighing machine numbers of the weighing machines selected for a cycle of combinatorial computation, for issuing a combination designation signal indicative of the selected weighing machines to said first multiplexer in response to the machine selection signal, for successively receiving weighing data from the selected weighing machines through said first multiplexer, for temporarily storing the received weighing data in a register in the combinatorial computing means, for combining the weighing data in a prescribed sequence to determine a combination of weights closest to and greater than a preset value, thereby effecting combinatorial computation, for delivering a computation end signal as a clear signal to said shift register and said memories after said combinatorial computation has been completed, to clear all flags stored in said shift register and said memories, and issuing the weighing data stored in the register in the combinatorial computing means in response to said all flags being cleared;

empty detection means, operatively connected to receive the weighing data, for detecting empty weighing machines among the weighing machines which have taken part in the previous combinatorial computation, for generating an empty detection signal when there is detected any empty weighing machine, and for setting an empty flag indicative of an empty hopper in a storage location in the empty memory for said detected empty weighing machine;

upper and lower limit setting units for storing upper and lower limits;

AND gates operatively connected to the weighing machines;

comparator means, operatively connected to said combinatorial computing means, said AND gates, and said upper and lower limit setting units, for comparing a total weight combination determined by said combinatorial computing means as being closest to the preset value after the detection by said empty detection means, with the upper and lower limits from said upper and lower limit setting units, to determine whether the total weight combination falls within the allowable preset range, for issuing an acceptance signal to allow said AND gates to pass the discharge command signal from said combinatorial computing means to the weighing machines giving said total weight combination when the total weight combination falls within the allowable preset range, to discharge the articles from the hoppers of the weighing machines and deliver the discharge command signal to said discharge memory, for issuing an under signal indicative of an insufficient supply of articles when the total weight combination is smaller than said allowable preset range, and for issuing an over signal indicative of an excessive supply of articles when the total weight combination is greater than the allowable preset range;

first and second OR gates operatively connected to said supplying means and said shift register control means, respectively;

empty flag detection means, operatively connected to receive flag information from said empty memory, and operatively connected to said first and second OR gates, for detecting whether there is any empty weighing machine with an empty flag in said empty memory based on the flag information in response to said under signal, for issuing an article supply command signal through said first OR gate to the supplying means of any empty weighing machine with an empty flag if there is any such empty weighing machine, and then issuing an operation command signal through the second OR gate to said shift register control means to enable said shift register control means to shift the weighing machine numbers and corresponding flags in said shift register for a next cycle of combinatorial computation, and for issuing a command signal when there is no weighing machine with an empty flag;

lightweight detector means operatively connected to receive the weighing machine numbers and corresponding weighing data in a cycle of combinatorial computation, and operatively connected to said first and second OR gates, for detecting a number of weighing machines with smaller weighing data among the supplied weighing data in response to said last-mentioned command signal, for issuing an additional article supply signal through said first OR gate to the supplying means of the detected weighing machines to supply additional articles to the detected weighing machines, thereby correcting any insufficient supply of articles which would result in a failure of finding a suitable total weight combination, for issuing said additional article supply signal to said addition memory to store addition flags in storage locations for the detected weighing machines to prevent the latter from being selected for the next cycle of combinatorial computation, and for thereafter issuing a command signal to said shift register control means through said second OR gate to start operation of said shift register control means; and grouping controller means for dividing the weighing machines into a plurality of groups, for selecting groups from said plurality of groups of weighing machines in response to said over signal, for issuing the weighing machine numbers of the selected weighing machines through said second multiplexer to said combinatorial computation means, and for generating a designating signal designating said selected weighing machines for a next cycle of combinatorial computation in synchronism with a supplied computation start signal.

2. A combinatorial measuring method for measuring a total quantity of articles using weight data from a plurality of weighing machines, comprising the steps of:

(a) performing cycles of combinatorial computation by combining the weight data from a selected group of the weighing machines to determine the optimum combination from the selected group of weighing machines for which the total quantity is closest to a preset value within an allowable preset range;

(b) periodically detecting whether any of the weighing machines in the selected group of weighing machines used in the combinatorial computation in said step (a) is empty; and (c) supplying articles to the empty weighing machines detected in said step (b).

3. A combinatorial measuring method according to claim 2, wherein said step (b) is carried out during each cycle of combinatorial computation.

4. A combinatorial measuring method according to claim 2, wherein said step (b) is carried out each time a predetermined number of cycles of combinatorial computation have been completed.

5. A combinatorial measuring method according to claim 2, wherein said step (a) comprises the substeps of:

(a1) performing a Jth cycle of combinatorial computation, where J is an integer greater than or equal to one;

(a2) selecting, as the selected group of weighing machines, a number of weighing machines from the plurality of weighing machines, except for those weighing machines having weight data which was combined to form the optimum combination in the Jth cycle of combinatorial computation and those weighing machines providing weight data indicating no articles, the number of selected weighing machines being less than or equal to a predetermined number; and (a3) performing a J+1st cycle of combinatorial computation on the weight data from the selected group of weighing machines.

6. A combinatorial measuring method according to claim 5, further comprising the steps of:

(d) determining whether the total quantity provided by the optimum combination of the selected group of the weighing machines is within the allowable preset range in the Jth cycle of combinatorial computation; and (e) selecting a new group of the weighing machines from all of the weighing machines for a J+1st cycle of combinatorial computation when the optimum combination of the selected group of the weighing machines in the Jth cycle of combinatorial computation provides a total quantity which is outside the allowable preset range.

7. A combinatorial measuring method according to claim 6, further comprising the steps of:

(f) determining when the total quantity closest to the preset value is less than the allowable preset range;

8. A combinatorial measuring method for measuring a total quantity of articles using weight data corresponding to a plurality of batches of articles, comprising the steps of:

(a) performing cycles of combinatorial computation by combining the weight data corresponding to a selected group of the batches of articles to determine the optimum combination from the selected group of batches of articles for which the total quantity is closest to a preset value within an allowable preset range;

(b) periodically detecting whether any of the batches of articles in the selected group of batches of articles, used in the combinatorial computation in said step (a) has a corresponding weight data indicating that there are no articles in the batch; and (c) supplying articles to the batch detected in said step (b).

9. A combinatorial measuring apparatus for measuring a total quantity of articles, comprising:

means for storing batches of the articles and for providing weighing data corresponding to each of the batches;

means for performing cycles of combinatorial computation by combining the weight data from a selected group of the batches to determine the optimum combination from the selected group of batches for which the total quantity is closest to a preset value within an allowable preset range, for periodically detecting whether any of the batches in the selected group of batches used in the combinatorial computation has a corresponding weight data which indicates that there are no articles in the batch, and for supplying articles to the detected batch having no articles.

10. A combinatorial measuring apparatus according to claim 9, wherein said means for performing cycles of combinatorial computation comprises:

means for performing a Jth cycle of combinatorial computation, where J is an integer greater than or equal to one;

means for selecting, as the selected group of batches, a number of batches from the plurality of batches, except for the batches which combine to form the optimum combination in the Jth cycle of combinatorial computation and batches having no articles, the number of selected batches being less than or equal to a predetermined number; and means for performing a J+1st cycle of combinatorial computation on the weight data from the selected batches selected by said selecting means.

* * * * *

UNITED STATES PATENT AND TRADEMARK OFFICE
CERTIFICATE OF CORRECTION

PATENT NO. : 4,533,006
DATED : AUGUST 6, 1985
INVENTOR(S) : KAZUKIYO MINAMIDA ET AL.

It is certified that error appears in the above-identified patent and that said Letters Patent is hereby corrected as shown below:

Col. 12, line 61, "524" should be --S24--.

Col. 20, Claim 7, after line 25, please insert the following:

--(g) selecting at least one weighing machine, from the selected group of weighing machines in the Jth cycle of combinatorial computation, providing weight data indicating a low weight relative to the other weighing machines;

(h) supplying the selected at least one weighing machine with additional articles; and (i) selecting weighing machines to form the selected group of weighing machines for combinatorial computation in the J+1st cycle of combinatorial computation from the weighing machines other than the selected at least one weighing machine selected in said step (g).--.

Signed and Sealed this

Twenty-sixth Day of November 1985

[SEAL]

Attest:

DONALD J. QUIGG

Attesting Officer     Commissioner of Patents and Trademarks